US005738370A

United States Patent [19]
Hosoi et al.

[11] Patent Number: 5,738,370
[45] Date of Patent: Apr. 14, 1998

[54] MOUNTING STRUCTURE AND METHOD FOR STEERING WHEEL

[75] Inventors: Akio Hosoi, Komaki; Atsushi Nagata, Inazawa; Katsunobu Sakane, Ichinomiya, all of Japan

[73] Assignee: Toyoda Gosei Co., Ltd., Aichi-ken, Japan

[21] Appl. No.: 772,546

[22] Filed: Dec. 24, 1996

[30] Foreign Application Priority Data

Dec. 27, 1995 [JP] Japan ................... 7-340728

[51] Int. Cl.⁶ ................................................ B60R 21/16
[52] U.S. Cl. ................ 280/731; 280/728.2; 280/728.1
[58] Field of Search ........................ 280/731, 728.2, 280/728.1

[56] References Cited

U.S. PATENT DOCUMENTS

| | | | |
|---|---|---|---|
| 3,827,715 | 8/1974 | Lynch | 280/731 |
| 5,201,541 | 4/1993 | Jones et al. | 280/731 |
| 5,409,256 | 4/1995 | Gordon et al. | 280/728.2 |
| 5,636,859 | 6/1997 | Williams et al. | 280/728.2 |
| 5,676,396 | 10/1997 | Fishl | 280/728.2 X |

FOREIGN PATENT DOCUMENTS

| | | | |
|---|---|---|---|
| 4317737 | 12/1993 | Germany | 280/731 |
| 2-133955 | 11/1990 | Japan . | |

*Primary Examiner*—Christopher P. Ellis
*Attorney, Agent, or Firm*—Cushman Darby & Cushman, IP Group of Pillsbury Madison & Sutro LLP

[57] ABSTRACT

A steering wheel that includes a body integrally formed from ring and spoke cores and a boss, has ring core, spoke core covers integrally formed with a central pad. The boss includes a through hole having an inner peripheral surface with a first serration. The steering shaft includes a bolt portion at a distal end and a second serration capable of engaging the first serration. The distal end of the steering shaft is inserted into the through hole of the boss so that the first serration engages the second serration. Then a nut is placed on the bolt portion by a tool capable of temporarily and releasably holding the nut and accessing the bolt portion through a space defined between the body and the boss. Thereafter, the nut is fastened on the bolt portion by a jig.

10 Claims, 9 Drawing Sheets

MOUNTING STRUCTURE AND METHOD FOR STEERING WHEEL

BACKGROUND OF THE INVENTION

1. Field of the Invention

The present invention relates to steering wheels for vehicles, and more particularly to a method and structure for mounting a steering wheel on a steering shaft.

2. Description of the Related Art

A typical steering wheel includes an outer gripping ring and a pad. The pad is located at the center of the ring and is connected to the ring by spokes. The gripping ring and the spokes incorporate a metal core. The core of the ring and the cores of the spokes are covered with a surface layer made of, for example, polyurethane foam.

The spoke cores are coupled to a boss plate located below the pad. The boss is fixed to the distal end of a steering shaft. The periphery of an area adjacent the steering shaft's distal end is provided with serrations to interfit with a boss plate that has a bore having serrations. The serrations of the steering shaft are embedded in the bore of the boss plate with a threaded bolt being formed at the distal end of the steering shaft protruding from the bore. A nut is fitted on the bolt and fastened thereto. The boss is thus fixed to the steering shaft.

Japanese Unexamined Utility Model Publication No. 2-133955 discloses a method for integrally forming a surface layer and a pad for eliminating lines between the surface layer and the pad. The method provides an integrally formed surface layer and pad, thereby improving an appearance of the steering wheel. The method also allows the steering wheel to have various appearances.

However, if the surface layer and the pad are integrally formed, the pad cannot be removed from the surface layer covering the ring core and the spoke cores. Therefore, with the spoke cores coupled to the boss plate, fastening the nut for fixing the boss plate to the steering shaft is difficult from above the steering wheel. Accordingly, there is a demand for an improved method for mounting a steering wheel on a steering shaft easily and securely even when the spoke cores are coupled to the boss plate.

SUMMARY OF THE INVENTION

Accordingly, it is an objective of the present invention to provide a method and structure for easily mounting a steering wheel to a steering shaft, in which the surface layers covering the ring core and the spoke cores are integrally formed with the pad.

To achieve the foregoing and other objectives, and in accordance with the purpose of the present invention, a method for mounting a steering wheel onto a steering shaft is provided. The steering wheel has a body and a boss. The body includes a ring portion with a ring core covered by a ring surface layer, a spoke portion with one or more spoke cores covered by a spoke surface layer continuously formed with the ring surface layer and a pad portion positioned in a central portion of the ring portion and integrally formed with the ring and spoke surface layers. The boss includes a through hole having an inner peripheral surface with a first serration area and is connected to the spoke cores by way of one or more connectors. The steering shaft includes at a distal end a bolt portion and a second serration area capable of engaging or meshing with the first serration area. The distal end of the steering shaft is inserted into the through hole of the boss so that the first and second serration areas mesh together. Then a threaded member or nut is placed on the bolt portion by a tool capable of temporarily holding the nut and that can access the bolt portion through a space defined between the body and the boss, which space opens beside the body. Next, the threaded member is fastened on the bolt portion by a tool or jig.

The present invention also provides a structure for mounting a steering wheel onto a steering shaft. The steering wheel has a body and a boss. The body includes a ring portion, a spoke portion and a pad portion. The ring portion has a ring core covered by a ring surface layer. The spoke portion has a spoke core covered by a spoke surface layer continuously formed with the ring surface layer. The pad portion is positioned in a central portion of the ring portion and integrally formed with the surface layers on the ring core and spoke core. The boss is connected to the spoke core by way of a first connector so that a space is defined between the body and the boss. The space opens beside the body. The boss includes a through hole having an inner peripheral surface with a first serration. The steering shaft has at a distal end a bolt portion and a second serration capable of engaging the first serration. A nut is fastened to the bolt portion when the distal end of the steering shaft is inserted into the through hole of the boss so that the first serration engages the second serration to secure the steering wheel to the steering shaft. The nut is positioned on the bolt portion while being temporarily held on a tool for placing the nut on the bolt portion through the space.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

A first embodiment of the present invention will now be described with references to FIGS. 1 to 9.

Figure 1:
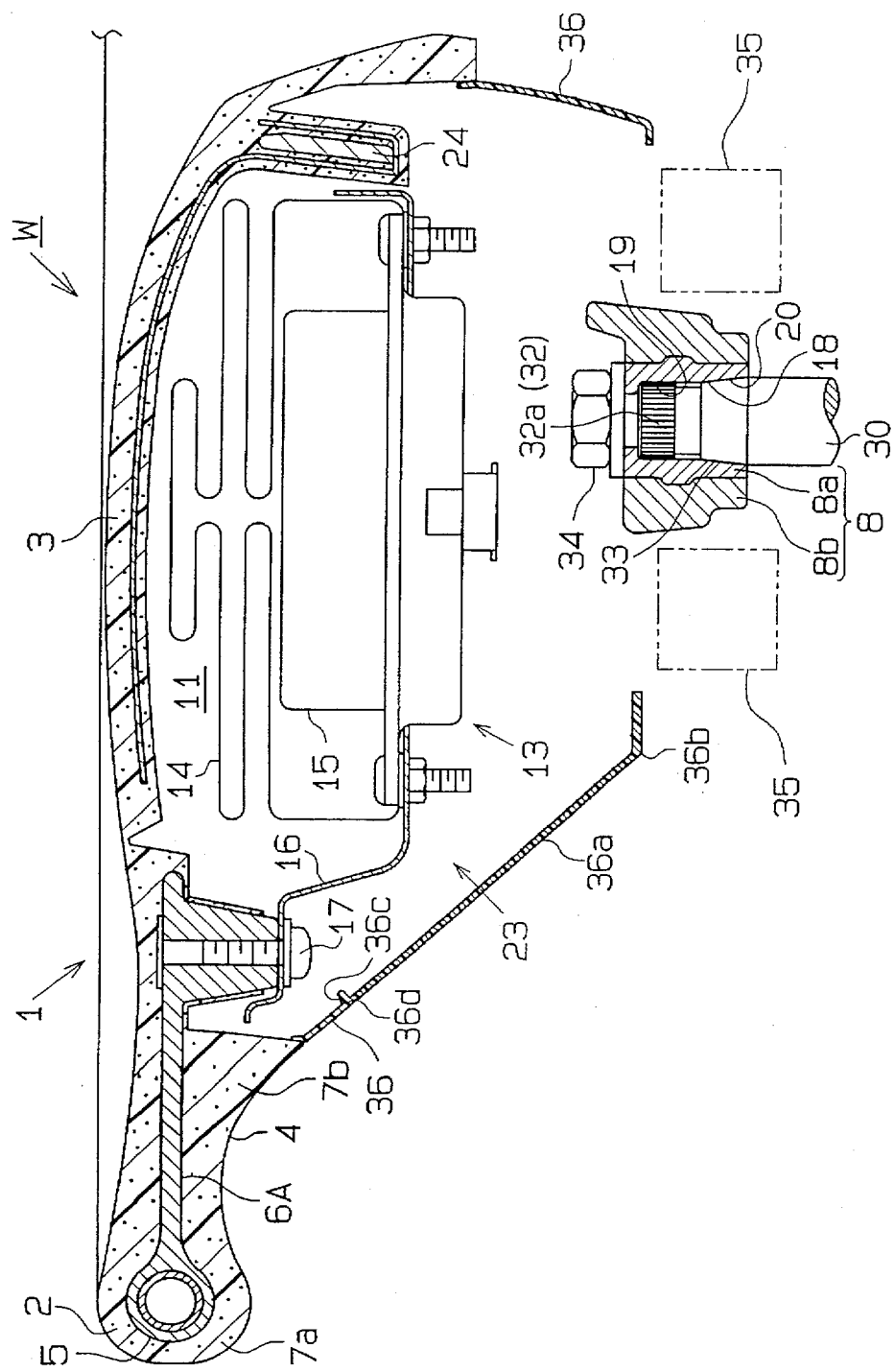
FIG. 1 is a cross-sectional view showing the mounting structure of a steering wheel according to a first embodiment of the present invention.
Figure 2:
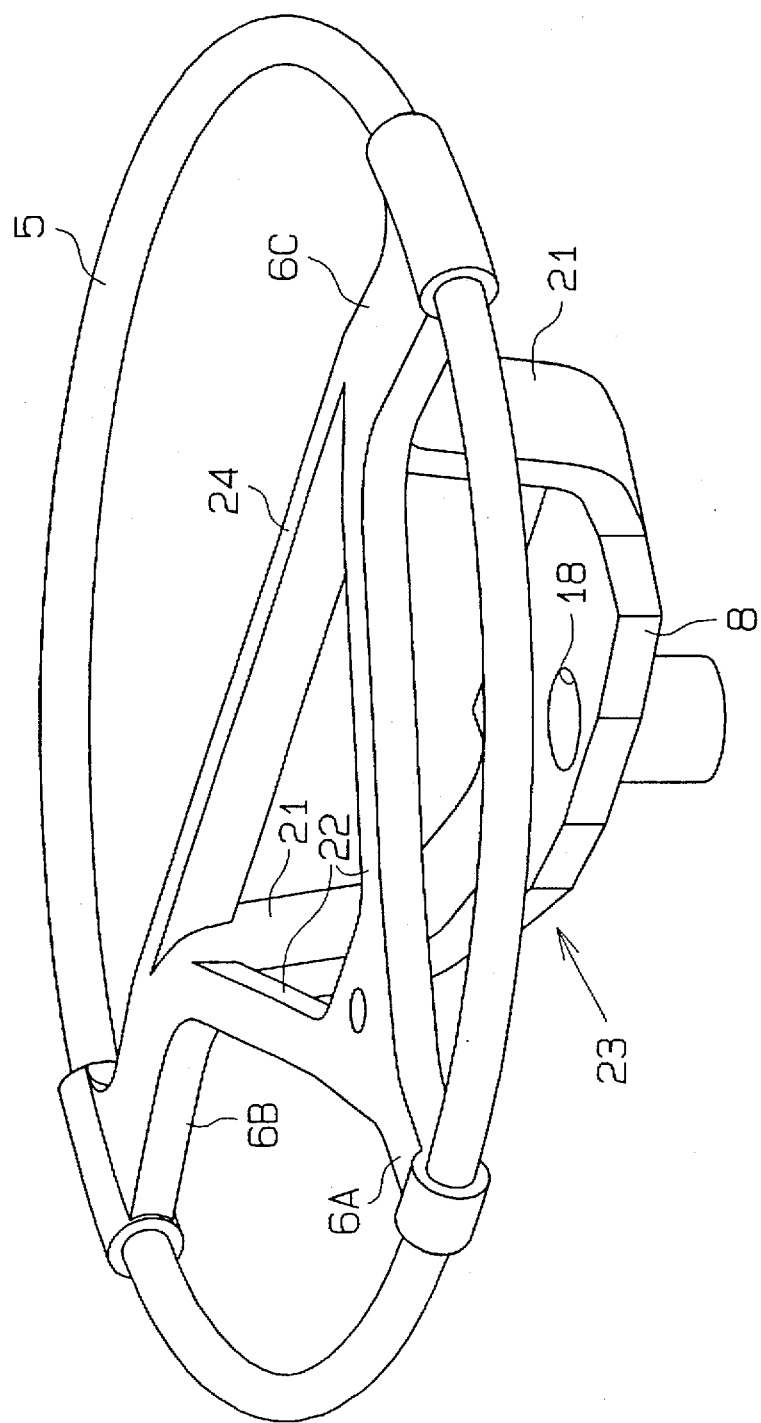
FIG. 2 is a perspective view showing the internal cores of a steering wheel.

FIG. 1 is a cross-sectional view illustrating a steering wheel W according to this embodiment. As shown in FIGS. 1 and 2, a wheel body 1 of the steering wheel W includes a ring 2, a pad 3 provided in the center of the ring 2 and spokes 4 connect the ring 2 and the pad 3. The ring 2 is constituted by a core 5, made, for example, of steel pipe, and a surface layer 7a covers the core 5. The spokes 4 are constituted by three spoke cores 6A, 6B, 6C made of light weight die-cast metal, such as aluminum, and a surface layer 7b covers each of the spoke cores 6A, 6B, 6C. The surface layers 7a, 7b and the pad 3 are integrally formed with soft synthetic resin (e.g., polyurethane foam). The wheel body 1 of the steering wheel W is secured to a boss plate 8 or is preferably integrally formed therewith. The securing structure of the wheel body 1 to the boss plate 8 will be described later.

A recess 11 is defined by the surface layer 7b at the bottom of the pad 3. A membrane switch (not shown) and an air bag mechanism 13 are located in the recess 11. The membrane switch includes upper and lower thin plates included in a horn switch circuit (not shown). Pressing the pad 3 from above causes the thin plates to contact one another, thereby sounding the horn.

The air bag mechanism 13 includes an air bag 14, an inflator 15 and a bag holder 16. The air bag 14 is folded and accommodated in the recess 11. The inflator 15 supplies gas into the air bag 14 to expand it. The bag holder 16 holds the air bag 14 and the inflator 15. The holder 16 is fixed to the spoke cores 6A, for example, by a bolt 17, as shown in FIG. 1. The fixing method of the holder 16 will be described later.

The mounting structure of the steering wheel W will now be described with reference to FIGS. 1 to 3.

Firstly, the mounting structure of the boss plate 8 will be described. As shown in FIG. 3, a bolt 31 is formed at the distal end of the steering shaft 30. The steering wheel protrudes toward the driver's seat in a vehicle's compartment. Serration 32 and a tapered portion 33 are formed below the threaded bolt 31 about the periphery at the distal end of the steering shaft 30. The serration 32 has a predetermined number (generally about thirty) of vertically arranged teeth 32a. The steering shaft 30 is inserted into a central bore 18 formed in the boss plate 8. Then a nut 34 is placed on and fastened to the bolt 31. The boss plate 8 is thus secured to the steering shaft 30.

The boss plate 8 is constituted by a steel portion 8a having a bore 18 and a die-cast aluminum portion 8b provided around the steel portion 8a. The steel portion 8a is fixed integrally to the aluminum portion 8b. The wall of the bore 18 is provided with a serration area 19 and a tapered portion 20 corresponding to serrations 32 and the tapered portion 33 of the steering shaft 30.

As shown in FIG. 2, the boss plate 8 is formed integrally with the spoke cores 6B, 6C and a pair of downwardly directed arms 21. In other words, the boss plate 8 is formed integrally with the core of steering body 1 of the steering wheel W and is located below the ring core 5 and spoke cores 6B, 6C. The spoke cores 6B, 6C are each coupled to the other spoke core 6A by separate connectors 22, respectively.

This structure improves the coupling strength of the spoke cores 6A, 6B, 6C, the ring core 5 and the boss plate 8. The boss 8, the arms 21 and the connectors 22 define a relatively large space 23. The space 23 opens to the driver's seat. A separate support bar 24 couples together the spoke cores 6B and 6C for improving the stability of the steering wheel when the air bag is operated.

Figure 7:
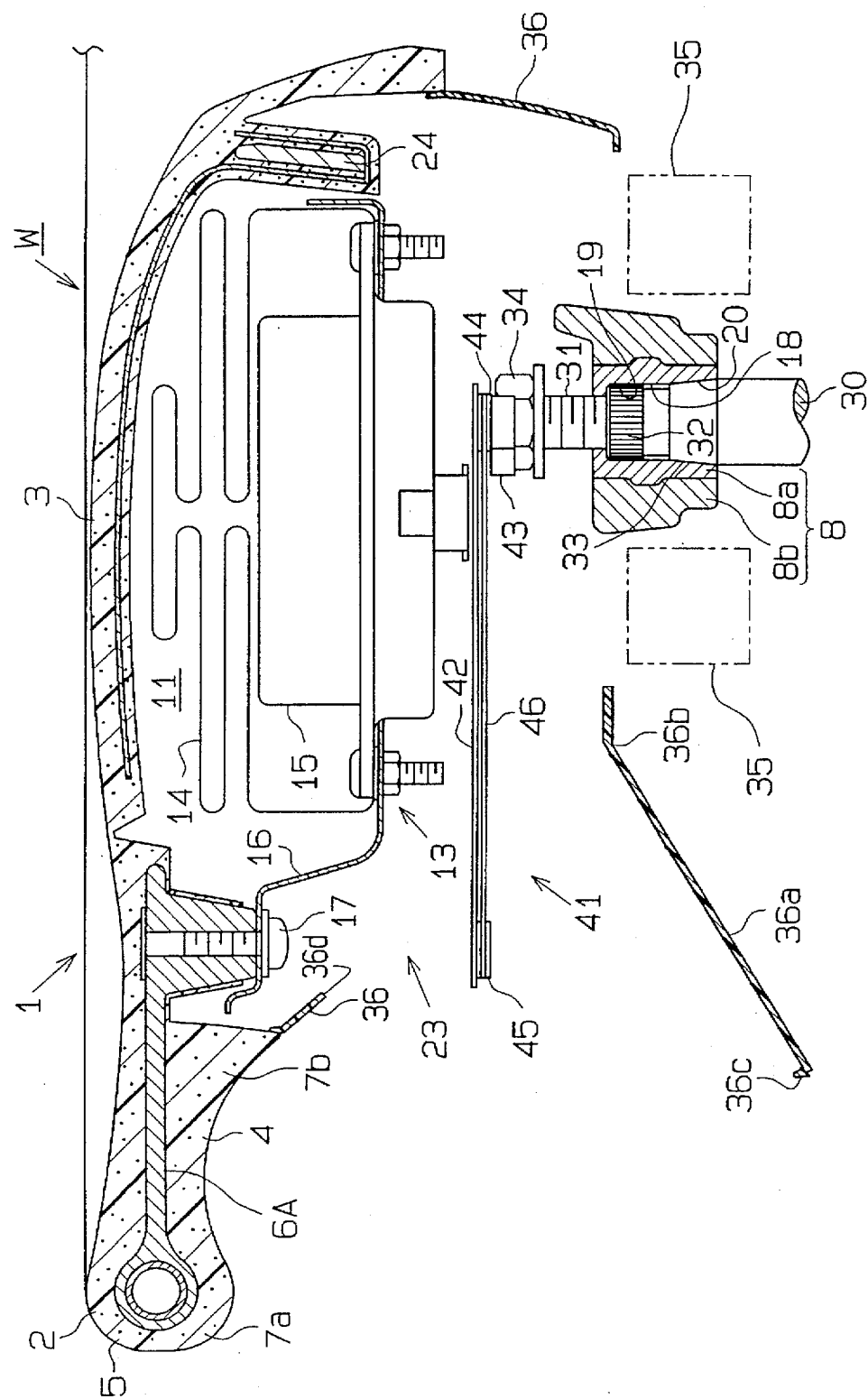
FIG. 7 is a cross-sectional view explaining a mounting method and a tool mounting a nut to a bolt.
Figure 8:
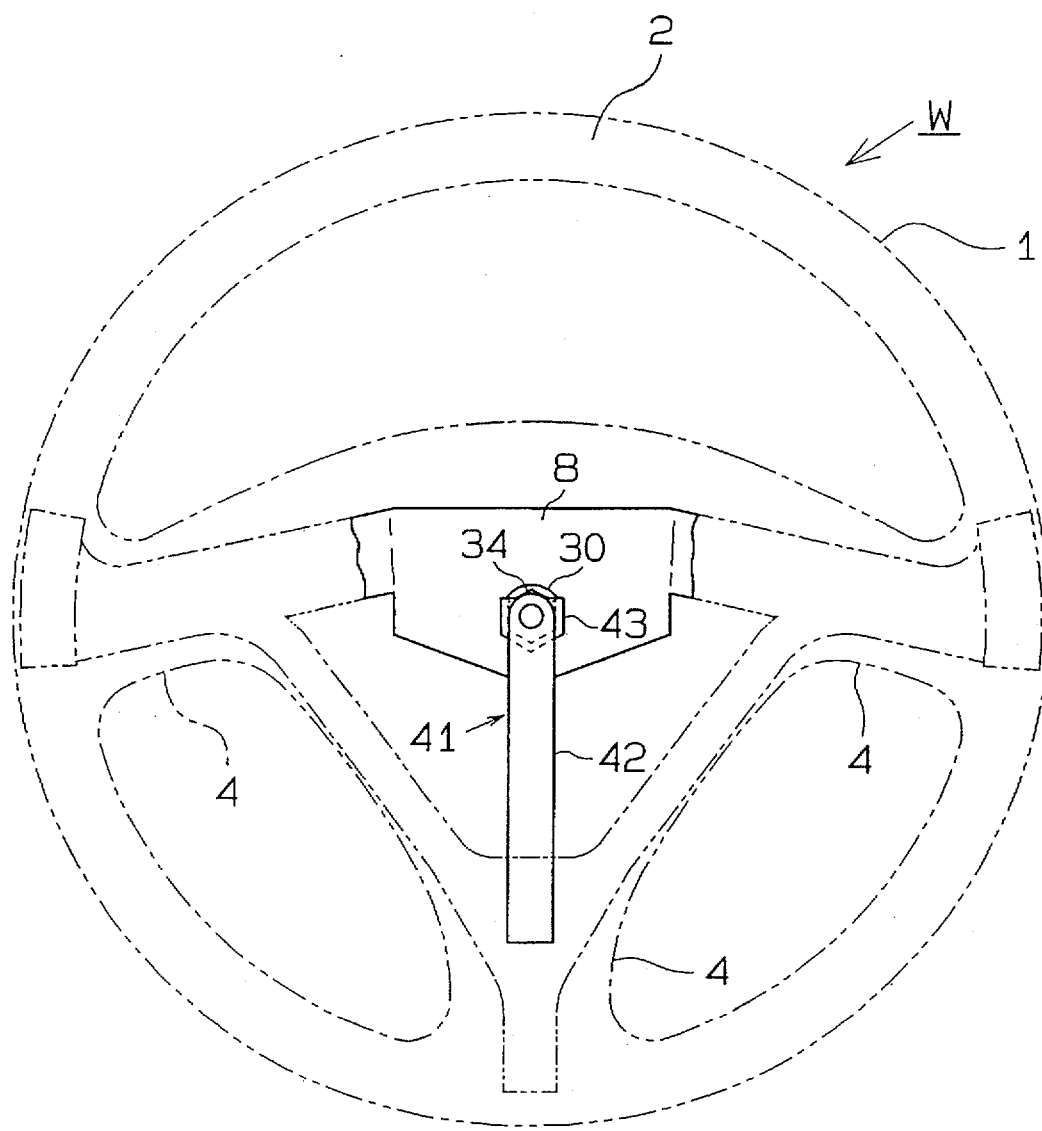
FIG. 8 is a plan view of a steering wheel, with parts cut away as shown in phantom for clarity, illustrating a nut being mounted to a bolt.
Figure 9:
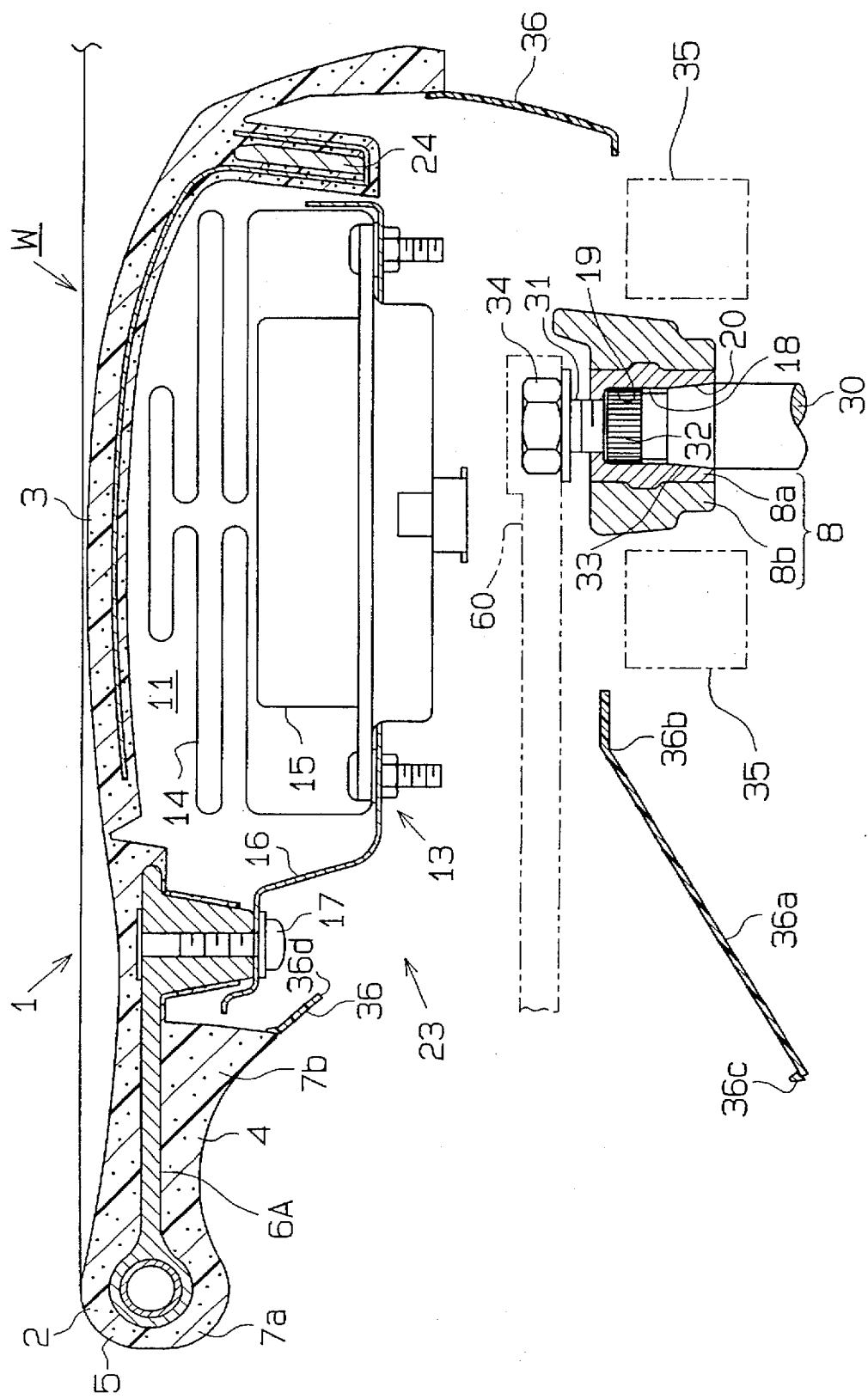
FIG. 9 is a cross-sectional view explaining a mounting method and showing the action for fastening a nut.

As shown in FIG. 1, spiral cables 35 are provided around the steering shaft 30 for feeding electricity to the air bag mechanism 13. A lower cover 36, formed from a resin material, is provided to cover the lower side of the steering body 1 of the steering wheel W, that is, the cover 36 covers the space 23. An opening 36d is formed in a portion of the lower cover 36 facing the driver's seat. A lid 36a is pivotally coupled to the lower cover 36 by a hinge 36b for opening and closing the opening 36d. In normal conditions, the lid 36a closes the hole 36d with an engagement portion 36c that can engage with part of the rim extending about the opening 36d as shown in FIG. 1. As shown in FIGS. 7 and 9, when securing the boss plate 8 to the steering shaft 30 by the nut 34, the lid 36a is rotated about the hinge 36 to open the opening 36d.

The process for mounting the steering wheel W to the steering shaft 30 will now be described.

Figure 4:
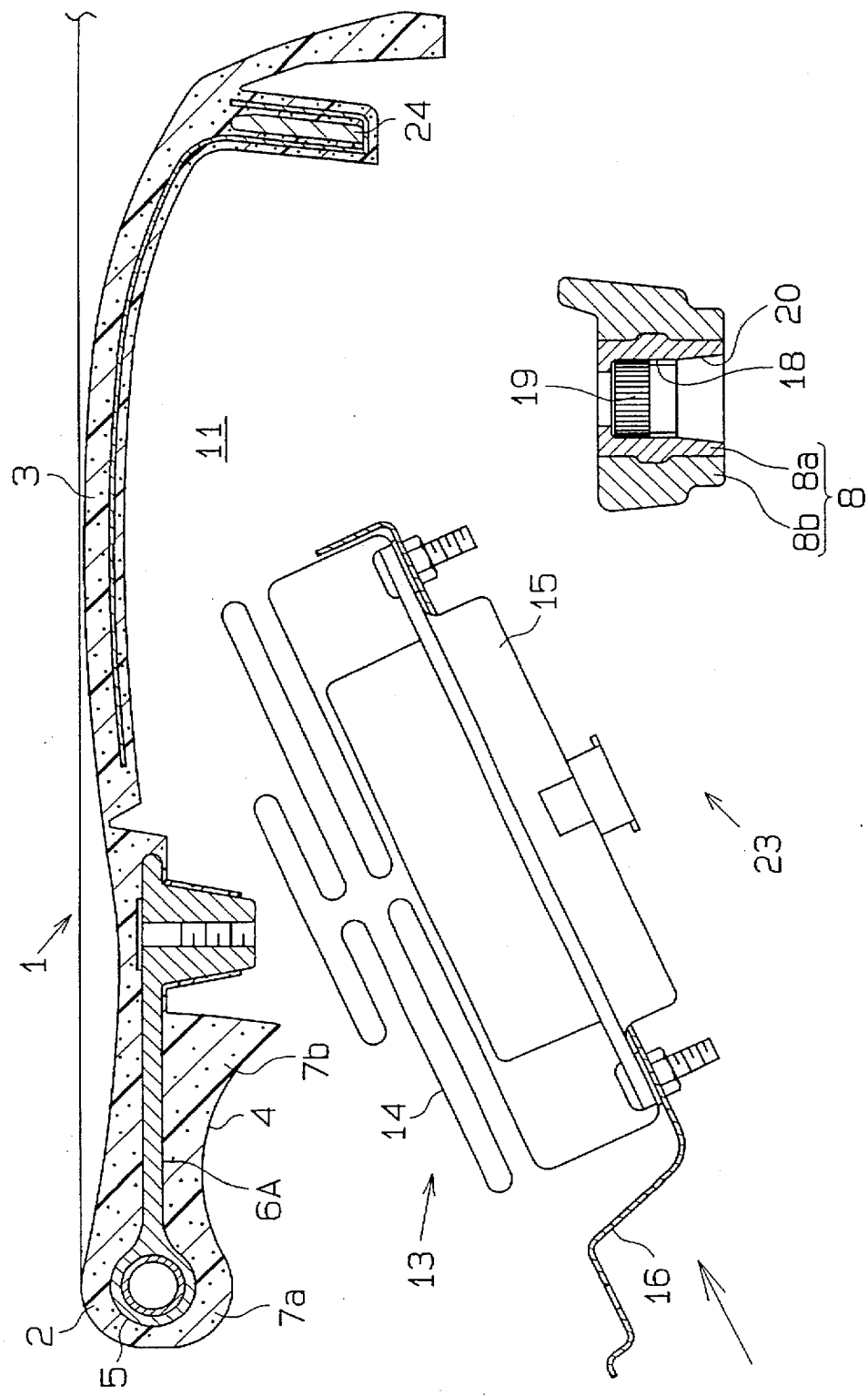
FIG. 4 is an exploded cross-sectional view explaining a mounting method for mounting an air bag mechanism to a steering wheel.

First, as shown in FIG. 4, the membrane switch (not shown) and the air bag mechanism 13 are inserted in the recess 11 beneath the pad 3 through the space 23 defined by the boss plate 8, the arms 21 and connectors 22. Then, the air bag holder 16 of the air bag mechanism 13 is secured to the spoke core 6A by a bolt 17. Since the space 23 is relatively large, the air bag mechanism 13 is smoothly inserted into the recess 1 and easily mounted on the wheel body 1.

Next, the lower cover 36 is attached to the wheel body 1. At this time, the engagement portion 36c of the cover 36 is released to open the lid 36a. This exposes the space 23 defined by the boss plate 8, the arms 21 and the connectors 22 to the outside from the opening 36d.

Figure 3:
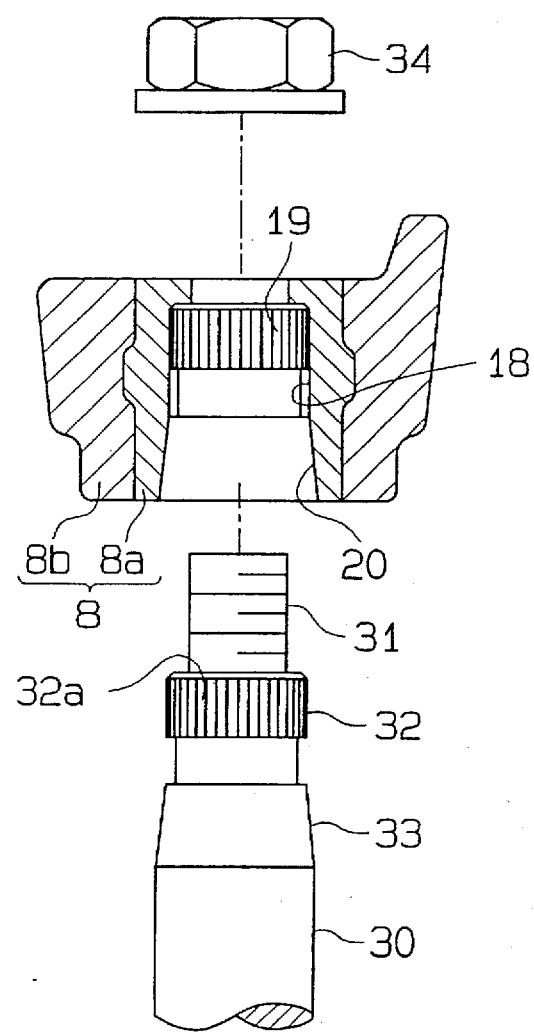
FIG. 3 is an exploded cross-sectional view showing mounting structure of a boss to a steering shaft.

As shown in FIG. 3, the distal end of the steering shaft 30 is inserted in the bore 18 of the boss plate 8. This meshes the serration 32 of the steering shaft 30 with the bore-serration 19. Since the boss plate 9 is formed integrally with the wheel body 1 of the steering wheel W, the steering wheel body 1 is mounted on the steering shaft 30 by inserting the steering shaft 30 in the boss plate 8.

Figure 5:
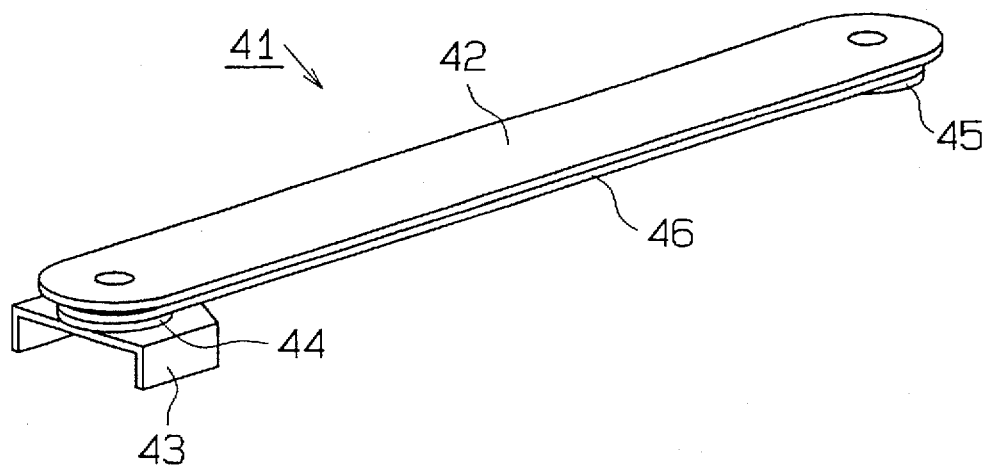
FIG. 5 is a perspective view illustrating a nut mounting tool seen from above.
Figure 6:
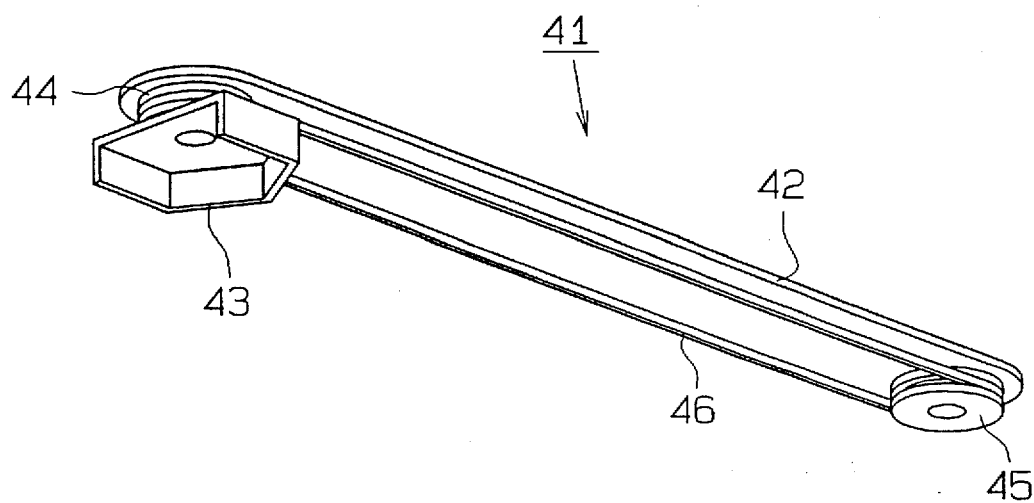
FIG. 6 is a perspective view illustrating a nut mounting tool seen from below.

Next, a nut 34 is fastened to a bolt after being positioned thereon. When positioning the nut 34, a tool 41 illustrated in FIGS. 5 and 6 is utilized. The tool 41 includes a longitudinal handle 42 and a jaw 43 provided at an end of the handle 42. The shape of the jaw 43 is substantially identical with the nut 34. The jaw 43 has an adhering means, such as magnet, so that the nut 34 can be placed in and releasably adhered to the jaw 43. The jaw 43 is pivotally supported with respect to the handle 42. A pulley 44 is located between the jaw 43 and the handle 42. The pulley 44 rotates integrally with the jaw 43. A pulley 45 is rotatably supported at the other end of the handle 42. A belt 46 is put on the pulleys 44, 45. Therefore, rotation of the pulley 45 causes the jaw 43 to rotate by means of the belt 46 and the pulley 44.

When positioning the nut 34 onto bolt 31, the nut 34 is held by the jaw 43 of the tool 41. Then the jaw 43 of the tool 41, which is holding the nut 34, is inserted into the space 23 through opening 36d. Tool 41 is held at a positioning where the nut 34 stays right above the bolt 31 of the steering shaft 30.

With the nut 34 positioned on the top of the bolt 31, pulley 45, which is located outside the space 23, is rotated for a predetermined number of revolutions (for example, two or three). This rotates the jaw 43, thereby rotating the nut 34. In this manner the nut 34 is screwed onto the bolt 31. The tool 41 is then raised upwardly, thereby releasing jaw 43 from the nut 34. The tool 41 is then extracted from the space 23 to the outside of the lower cover 36.

Next, as shown in FIG. 9, a separate tool or jig (for example, a known automatic nut fastener) 60 is inserted in the space 23 through the opening 36 and is engaged with the nut 34, which is positioned on the bolt 31. Since the nut 34 has been screwed to the bolt 31 to a certain amount, the jig 60 is easily engaged with the nut 34. In this state, the nut 34 is firmly fastened to the bolt 31 by the jig 60. In this manner, the steering wheel W is secured to the steering shaft 30. Then, the jig 60 is extracted from the space 23 to the outside of the lower cover 36. The lid 36a of the lower cover 36 is closed and the engage portion 36c is engaged with the rim of the opening 36d. The mounting of the wheel W to the shaft 30 is thus completed.

As described above, the space 23 is defined between the wheel body 1 of the steering wheel W and the boss plate 8 located below the wheel body 1. The tool 41 is inserted from a side of the wheel body 1. The nut 34 is positioned on bolt 31 by the tool 41. Then the jig 60 is inserted from a side of the body 1 into the space 23. The nut 34 is fastened to the bolt 61 by the jig 60. Therefore, even if the surface layer 7a, which covers the ring core 5, the surface layer 7b, which covers the spoke cores 6A to 6C, and the pad 3 are formed integrally, the steering wheel W is easily and securely mounted on the steering shaft 30.

The boss plate 8 is formed integrally with the spoke cores 6B, 6C and the arms 21 such that the plate 8 is located below the ring core 5 and the spokes cores 6A to 6C. Further, the spoke cores 6B, 6C are coupled to the other spoke cores 6A by the connector 22. The boss plate 8, the arms 21 and the connectors 22 define the space 23. Therefore, the space 23 can be formed large enough so that the positioning and the fastening of the nut 34 and the mounting of the air bag mechanism 13 are easily and positively performed. Further, forming the large space 23 does not degrade the strength of the cores 5 and 6A to 6C. Accordingly, the rigidity and the stability while usage of the steering wheel W are ensured.

Tool 41 eliminates the necessity for inserting a hand in the space 23 for positioning the nut 34, thereby facilitating placement of nut 34 onto bolt 31 of the steering shaft 30.

The present invention may be embodied in the following forms.

(1) In the first embodiment, the tool 41 is used for positioning the nut 34 onto bolt 31. However, any tool that can be inserted into the space 23 through the opening 36d, and will hold the nut 34 at the inserted end and rotate the nut for certain degrees may be utilized.

Figure 10:
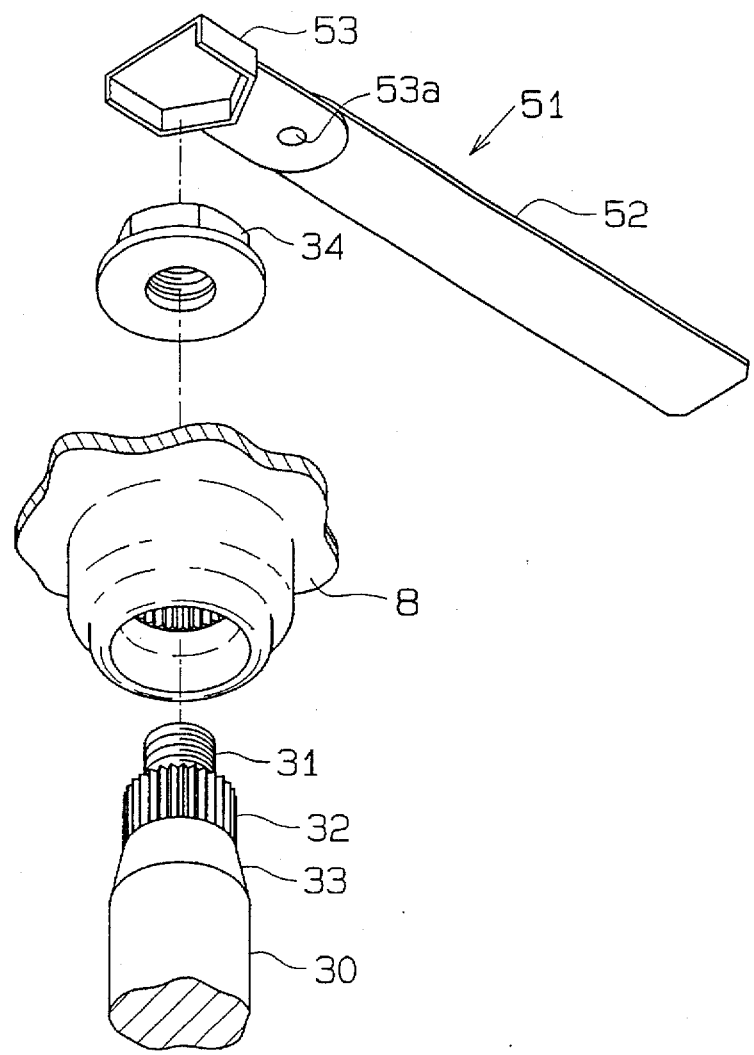
FIG. 10 is an exploded perspective view showing a tool according to a second embodiment of the present invention.
Figure 11:
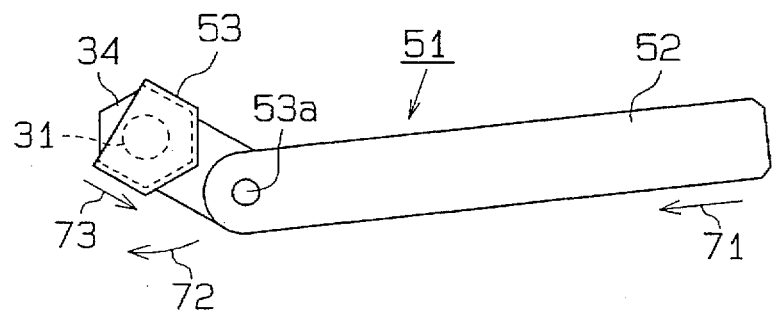
FIG. 11 is a plan view showing the action for fixing a nut using a tool according to a second embodiment of the present invention.

For example, a tool 51 according to a second embodiment of the present invention as shown in FIGS. 10 and 11 may be utilized. The tool 51 has a longitudinal handle 52 and a jaw 53. The jaw 53 is rotatably supported at an end of the handle by a pivot 53a. The jaw 53 includes an adhering means such as magnet for holding the nut 34.

When positioning the nut 34 to the bolt 31, the jaw 53 is held straight with the handle 52 as shown in FIG. 10. In this state, the nut 34 is held by the jaw 53. The tool 51 is then inserted in the space 23 through the opening 36d from the jaw 53 holding the nut 23. The tool 51 is held at a position where the nut 34 is located right above the bolt 31.

With the nut 4 placed on the top of bolt 31, a portion of the handle 52 that protrudes from the opening 36d, is pushed substantially along the longitudinal direction of the handle 52 (the direction illustrated by an arrow 71 in FIG. 11). This rotates the jaw 53 in the clockwise direction with respect to the pivot 53a. In other words, the jaw 53 is rotated about the axis of the nut 34 placed on the bolt 31 in a direction illustrated by an arrow 72 in FIG. 11. The jaw 53 rotates the nut 34. The nut 34 is thus positioned on the bolt 31. Then the tool 51 is either moved upward or in a direction illustrated by an arrow 73 (the longitudinal direction of the handle 53) in FIG. 11. This releases the jaw 53 from the nut 34 leaving the nut fastened to the bolt 31. The tool 51 is then extracted from the space 23 to the outside of the lower cover 36.

(2) A releasably adhering mechanism, such as a magnet, is used to hold the nut 34 within the jaws 43, 53 of the tools 41, 51, respectively. However, any means that can temporarily hold the nut 34 within the jaws 41, 51, for example, an engaging device that frictionally engages the nut 34, may be utilized.

(3) The steering wheel W has three spoke cores 6A to 6C. However, the number of the spoke cores are not limited to this number. The number of the spoke cores may be less or more than three.

(4) The steering wheel W in the above embodiments incorporates air bag mechanism 13. However, the present invention may be embodied in steering wheels having no air bag mechanism. For example, the present invention may be embodied in a steering wheel having a box-shaped shock absorbing device instead of the air bag mechanism 13.

Therefore, the present examples and embodiment are to be considered as illustrative and not restrictive and the invention is not to be limited to the details given herein, but may be modified within the scope of the appended claims.

What is claimed is:

1. A method for mounting a steering wheel onto a steering shaft, said steering wheel having a body and a boss, wherein said body includes a ring portion with a ring core covered by a ring surface layer, a spoke portion with a spoke core covered by a spoke surface layer continuously formed with the ring surface layer and a pad portion positioned in a central portion of the ring portion and integrally formed with the ring and spoke surface layers, wherein the boss includes a through hole having an inner surface including a first serration, the boss being connected to the spoke core by way of a connector, and wherein said steering shaft includes a threaded bolt portion at a distal end and a second serration capable of engaging the first serration, said method comprising steps of:

inserting the distal end of the steering shaft into the through hole of the boss so that the first serration engages the second serration;

placing a nut on the bolt portion by a tool capable of temporarily holding the nut and accessing the bolt portion through a space defined between the body and the boss, said space opening beside the body; and fastening the nut on the bolt portion.

2. The method according to claim 1 further including the step of mounting an air bag mechanism to the body through the space prior to the inserting step.

3. The method according to claim 1 wherein the steering wheel includes a lower cover covering the space, the lower cover having an opening for communicating said space and a lid for selectively opening and closing the opening; and said placing step includes opening the lid and inserting the tool temporarily holding the nut through the opening into the space.

4. The method according to claim 3, wherein said fastening step further includes the step of inserting a jig through the opening into said space when said lid is open and onto the nut to fully fasten the nut.

5. The method according to claim 3 further including:

the steps of mounting an air bag mechanism to said body through said space prior to the first inserting step; and attaching the lower cover onto the body after the mounting step and prior to the first inserting step.

6. The method according to claim 5, wherein said fastening step further includes inserting a jig into said space through said opening when said lid is open and onto the nut to fully fasten the nut.

7. A system for mounting a steering wheel onto a steering shaft, said steering wheel having a body and a boss, comprising:

said body including a ring portion, a spoke portion and a pad portion, said ring portion having a ring core covered by a ring surface layer, said spoke portion having a spoke core covered by a spoke surface layer continuously formed with said ring surface layer, and said pad portion being positioned in a central portion of the ring portion and integrally formed with said ring and spoke surface layers;

said boss being integrally connected to said spoke core so that a space is defined between said body and said boss, said space opening adjacent said body, said boss including a through hole having an inner peripheral surface provided with a first serration;

said steering shaft having a bolt portion at a distal end and a second serration capable of engaging said first serration; and a tool releasably holding a nut that can position the nut over said distal end, once said distal end is inserted into said through hole with the first and second serrations meshed together, so that said tool can initially fasten the nut to said bolt portion.

8. The system according to claim 7 further comprising:

a plurality of spoke cores, a first connector connecting a part of said plurality of spoke cores with said boss so that said boss is located below said ring core and said plurality of spoke cores;

a second connector interconnecting said plurality of spoke cores; and said space being defined in an area surrounded by said boss, said first connector and said second connector.

9. The system according to claim 7 further comprising:

a lower cover for covering said space, said lower cover having an opening providing access into said space and a lid for selectively opening and closing said opening; and said tool being inserted through said opening into said space when said lid is open.

10. The system according to claim 7, wherein said steering wheel includes an air bag mechanism mounted to said body through said space.

* * * * *